United States Patent [19]
McIntyre

[11] Patent Number: 5,812,899
[45] Date of Patent: Sep. 22, 1998

[54] METHOD AND APPARATUS FOR PROVIDING AN AUTOMATED NARRATION FOR A PLURALITY OF IMAGES

[75] Inventor: Dale F. McIntyre, Honeoye Fall, N.Y.

[73] Assignee: Eastman Kodak Company, Rochester, N.Y.

[21] Appl. No.: 633,634

[22] Filed: Apr. 17, 1996

[51] Int. Cl.⁶ .................................................. G03B 19/00
[52] U.S. Cl. ................................................ 396/661; 40/906
[58] Field of Search ........................ 354/76, 175, 106; 40/906

[56] References Cited

U.S. PATENT DOCUMENTS

| | | | |
|---|---|---|---|
| 4,541,188 | 9/1985 | Sadorus | 40/152.1 |
| 4,748,756 | 6/1988 | Ross | 40/152 |
| 4,791,741 | 12/1988 | Kondo | 40/124 |
| 4,809,246 | 2/1989 | Jeng | 434/317 |
| 5,063,698 | 11/1991 | Johnson et al. | 40/124 |
| 5,182,872 | 2/1993 | Lee et al. | 40/152 |
| 5,359,374 | 10/1994 | Scwartz | 354/76 |
| 5,387,955 | 2/1995 | Cocca | 354/76 |
| 5,389,989 | 2/1995 | Hawkins et al. | 354/106 |
| 5,452,291 | 9/1995 | Eisenhandler et al. | 370/54 |
| 5,505,901 | 4/1996 | Harney et al. | 348/10 |
| 5,521,663 | 5/1996 | Norris, III | 354/106 |

*Primary Examiner*—Safet Metjahic
*Assistant Examiner*—Christopher E. Mahoney
*Attorney, Agent, or Firm*—Peyton C. Watkins

[57] ABSTRACT

An image receptacle comprises a detector for detecting a first play-mode signal. A sound control module records sound, and emits the recorded sound upon receiving the first play-mode signal from the detector. Upon receiving a signal from the sound control module, an emitter emits a second play-mode signal to a second image receptacle for initiating the second image receptacle to emit its associated sound.

17 Claims, 3 Drawing Sheets

METHOD AND APPARATUS FOR PROVIDING AN AUTOMATED NARRATION FOR A PLURALITY OF IMAGES

FIELD OF THE INVENTION

The present invention relates generally to the field of picture frames having a device for playing recorded sound positioned in an interior portion of the frame for providing a verbal message about an image within the frame and, more particularly, to a method and apparatus, for example, providing an automated, verbal narration for a plurality of such frames containing an image.

BACKGROUND OF THE INVENTION

Some greeting cards contain electronic recording and playback devices in a portion of its border for recording and playback of, for example, personalized messages, such as those disclosed in U.S. Pat. Nos. 4,791,741 and 5,063,698.

Some picture frames also contain recording and playback devices for similar purposes. One such frame is disclosed in U.S. Pat. No. 5,359,374 in which a still video image is placed within a frame or plaque, and a message is stored on a recording and playback unit. A touch sensitive picture frame is disclosed in U.S. Pat. No. 4,748,756 in which a sound or light is activated when certain portions of the frame are touched.

Although the above-described greeting cards and picture frames are satisfactory, improvements are always desirable.

Consequently, a need exists for an improved method and apparatus for providing a message or the like about the image within the frame.

SUMMARY OF THE INVENTION

The present invention is directed to overcoming one or more of the problems set forth above. Briefly summarized, according to one aspect of the present invention, a picture receptacle comprises (a) means for detecting a first play-mode signal; (b) a sound control module which records sound, and which emits the recorded sound upon receiving the first play-mode signal from said detecting means for emitting the recorded sound associated with the picture receptacle; and (c) means, upon receiving a signal from said sound control module, for emitting a second play-mode signal to a second picture receptacle for initiating the second picture receptacle to emit its associated sound.

It is an object of one aspect of the present invention to provide a method and apparatus for providing an automated, verbal narration of an event which is visually illustrated by a plurality of images.

It is an advantage of one aspect of the present invention to provide a cost-efficient method and apparatus for illustrating the verbal and visual narrative of the event.

It is a feature of the present invention to provide an emitter of a first picture frame for emitting a play-mode signal to a second picture frame for initiating the second picture receptacle to play its recorded sound.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
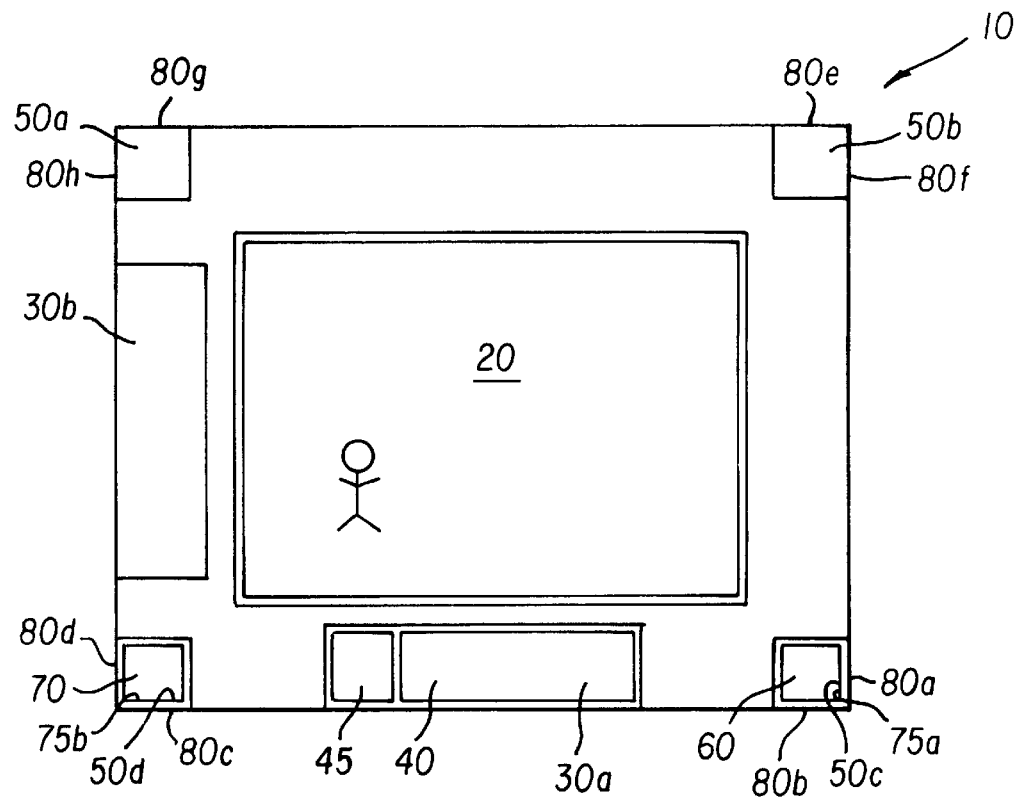
FIG. 1 is a front view of a picture frame of the present invention.

Referring to FIG. 1, there is illustrated a picture receptacle 10 positioned for displaying a landscape view of a photographic image 20. It is instructive to note that the picture receptacle 10 may include any semi-rigid or rigid material adhered either to the border of the image or the non-displaying, reverse-side portion of the image; however, the picture receptacle 10 is shown as a rectangular-shaped picture frame 10 for purposes of illustrating a preferred embodiment. The picture frame 10 includes two hollowed-out portions 30a and 30b for permitting either of the two portions, portion 30a in the preferred embodiment, to receive a sound control module 40 (i.e., SCM) which is secured to the hollowed out portion 30a by any suitable means such as screws (not shown), and which records sound and emits the recorded sound, as will be described in detail below. The frame 10 contains the two portions 30a and 30b so that the SCM 40 is preferably placed in portion 30a when a landscape display is desired, and in portion 30b when a portrait display is desired. A control panel 45 is also secured by screws (not shown) within the hollowed-out portion 30a for containing additional peripheral hardware which is discussed in detail below. The picture frame 10 further includes four hollowed-out portions 50a, 50b, 50c and 50d at each corner of the picture frame 10 for permitting two of the hollowed-out portions, portion 50c and 50d in the preferred embodiment, to respectively receive an emitter 60 and a detector 70, both of which are further described in detail below. Both the emitter 60 and detector 70 are respectively mounted in a suitable housing 75a and 75b which is secured to their respective hollowed-out portions 50c and 50d by any suitable means such as screws (not shown). It is instructive to note that there are four hollowed-out portions 50a, 50b, 50c and 50d so that the emitter 60 and detector 70 may be switched between them as desired. Both the emitter 60 and detector 70 are preferably mounted within its respective portion 50c and 50d so that its exposed surface of the housings 75a and 75b is flush with the surface of the frame 10 so that a mesh cover (not shown) may be placed over it for aesthetic purposes. The emitter 60 and detector 70 are both mounted in the housing 75a and 75b with each housing 75a and 75b including two lenses 80a, 80b, 80c and 80d along a side surface of each housing 75 for permitting both the entrance and exit of signals. This facilitates the switching between hollowed-out portions 50a, 50b, 50c and 50d because the entire housings 75a and 75b containing either the emitter 60 or detector 70 and its corresponding lenses are moved as a unit.

Figure 2A:
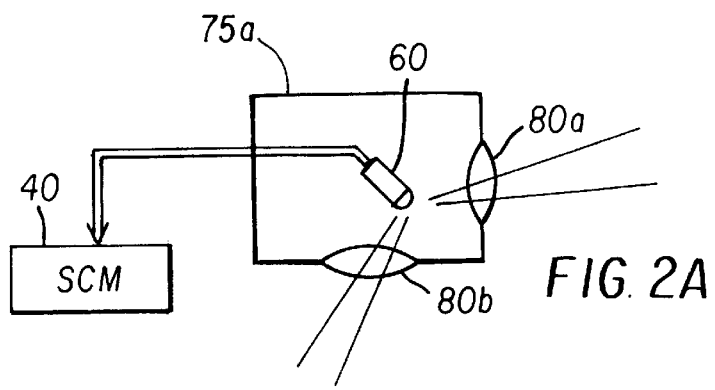
FIG. 2A is a detail view of an emitter of the present invention.
Figure 2B:
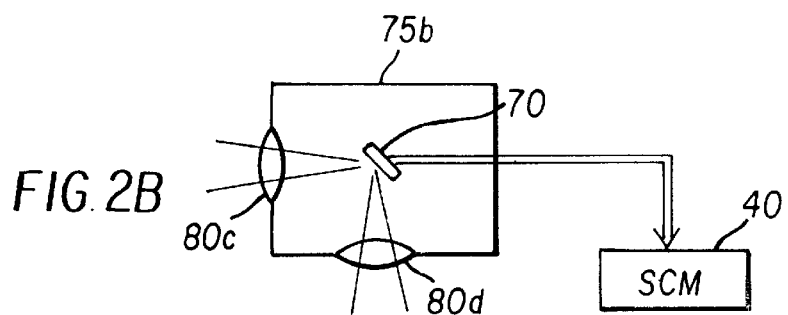
FIG. 2B is a detail view of a detector of the present invention.

Referring now to FIGS. 2A and 2B, and specifically to FIG. 2B, the detector 70, which is preferably a photodetector, and the lenses 80c and 80d are shown in detail. An incoming signal passes through the lenses 80a and 80b which focus the signal on the detector 70. A coded address, of which the significance and detail are discussed below, is contained within the signal, and is sent to the SCM 40 for further processing, as is discussed in detail below. As best illustrated in FIG. 2A, the emitter 60 is preferably an infrared diode and emits a signal through the lenses 80a and 80b which collimate a portion of the signal for transmission to another frame 10, as discussed in detail below.

The detector 70, which is preferably an infrared detector, although an audible or ultrasonic detector may also be used, detects signals from an emitter 60 of another picture frame (both of which are not shown in FIG. 2) for initiating playback of the recorded sound of the SCM 40. Such detectors 70 described above are well known in the art for detection purposes. The emitter 60, which is preferably an infrared emitter, although an audible detector or ultrasonic may also be used, emits signals to a detector 70 of another picture frame 10 (both of which are not shown in FIG. 2) after the recorded sound of its SCM 40 is concluded. Such emitters 60 described above are well known in the art for the emission of signals.

Figure 3:
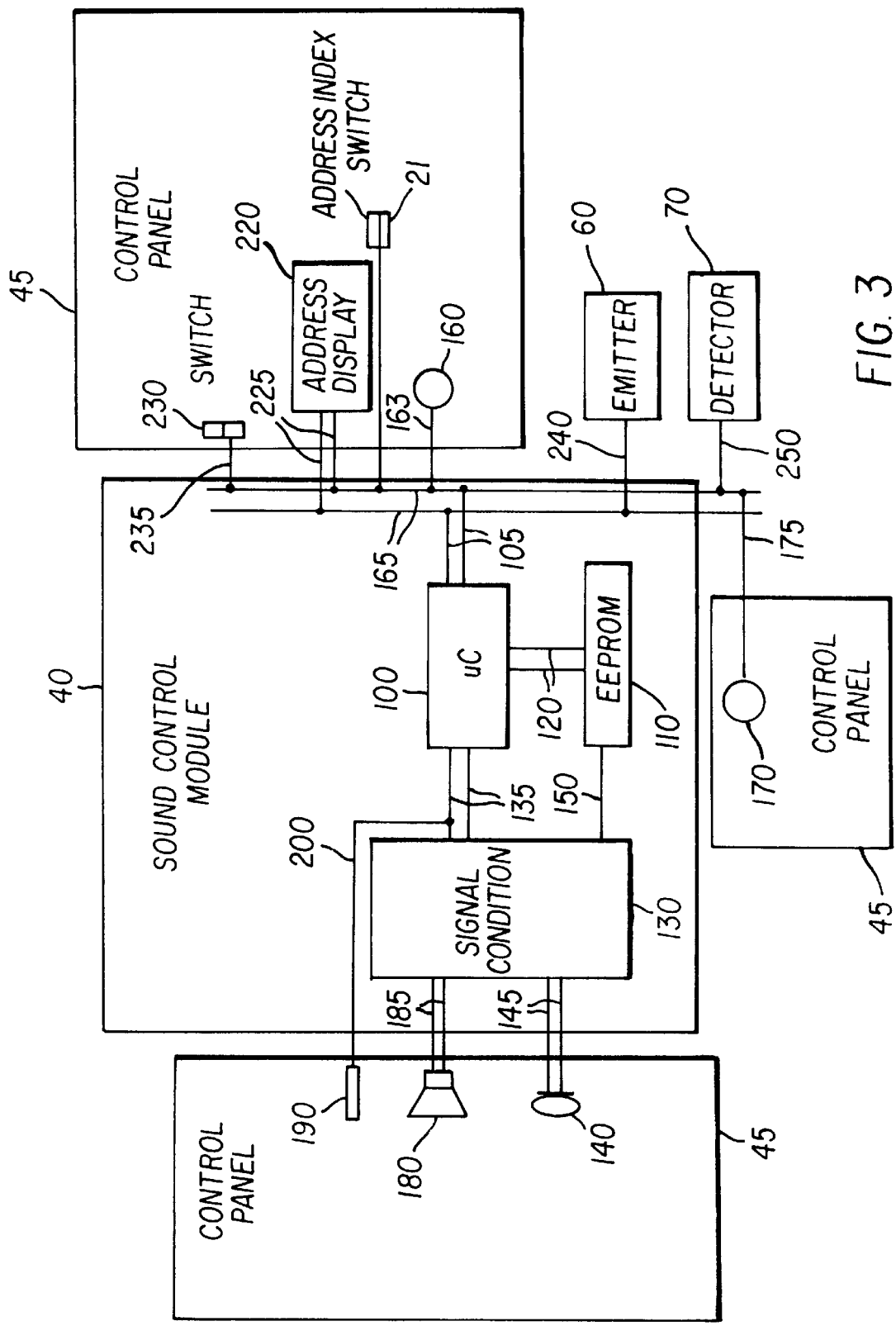
FIG. 3 is a schematic diagram of a sound control module and its associated peripheral hardware of the picture frame of FIG. 1.

Referring now to FIG. 3, there is illustrated a schematic diagram of the sound control module 40 having peripheral devices, some of which have already been described and some of which are described in detail later, electrically connected to it. The SCM 40 includes a microcontroller 100 for coordinating and controlling the functions of the SCM 40. The microcontroller 100 is electrically connected to a bus 165, via leads 105, at one pair of terminals for permitting reception of and sending of signals to the emitter 60, detector 70 and other below-described hardware. An analog electrical erasable programmable read only memory 110 (i.e., EEPROM), such as manufactured by Information Storage Devices, Inc. in San Jose, Calif., is electrically connected to the microcontroller 100 via a pair of wires 120, and stores the recorded sound of the SCM 40. A signal conditioner 130 is electrically joined to the microcontroller 100 by a pair of wires 135 for conditioning signals as they enter and exit the SCM 40, such conditioning is well known in the art.

A microphone 140, located the in the control panel 45, is electrically linked to the signal conditioner 130 via leads 145 for permitting sound, typically music or spoken text individually or in combination, to enter the SCM 40 where it is first conditioned by the signal conditioner 130 and enters, via leads 150, the EEPROM 110 where it is stored in electronic form. A recording switch 160, located in the control panel 45, is electrically connected via wires 163 to the electrical bus 165 and, in turn, the microcontroller 100 and, when activated, sends a signal to the microcontroller for directing the microcontroller 100 to input the incoming sound through the signal conditioner 130. The EEPROM 110 erases over previously recorded sound, if any, when incoming sound is received so that the above-described sound recording process may be repeated as many times as the user desires until the desired recording is obtained.

A play switch 170, also located in the control panel 45, is also electrically connected via lead 175 to the bus 165 and, in turn, the microcontroller 100 and, when activated, sends a signal to the microcontroller 100 for directing the microcontroller 100 to retrieve the sound from the EEPROM 110 for audible reproduction. The switch 170 is preferably a remote switch or a motion detector both of which are well known in the art. The sound is then passed through the signal conditioner 130 and into a speaker 180 contained within the control panel 45 by wires 185 for permitting the sound to be reproduced. An indicator light 190, also located in the control panel 45, receives a signal, via a lead 200, from the microcontroller 100 when the sound is being reproduced. This activates the indicator light 190 for permitting visual indication that the SCM 40 is in the play mode.

A variable address index switch 210, such as a dual inline package (i.e., DIP) or a numbered rotating switch, is contained within the control panel 45 and is electrically connected via leads 225 to the bus 165 and, in turn, to the microcontroller 100 for passing a signal to the microcontroller 100 that indicates which particular signal the detector 70 detects. The control panel 45 further includes an address display 220, such as a seven segment light emitting diode (i.e., LED), and is attached to the address index switch 210 for providing visual indication of the current setting of address index switch 210.

A mode switch 230, located in the control panel 45, is electrically connected via a lead 235 to the bus 165 and, in turn, to the microprocessor 100, which switch 230, when activated, sends a signal to the microcontroller 100 for directing the microcontroller 100 to disregard its normal operation of playing the recorded sound for permitting a test mode operation, as will be described in detail below.

The emitter 60 and detector 70 are both respectively connected to the bus 165, via wires 240 and 250,. for permitting reception of and sending of signals to the microcontroller 100.

Figure 4:
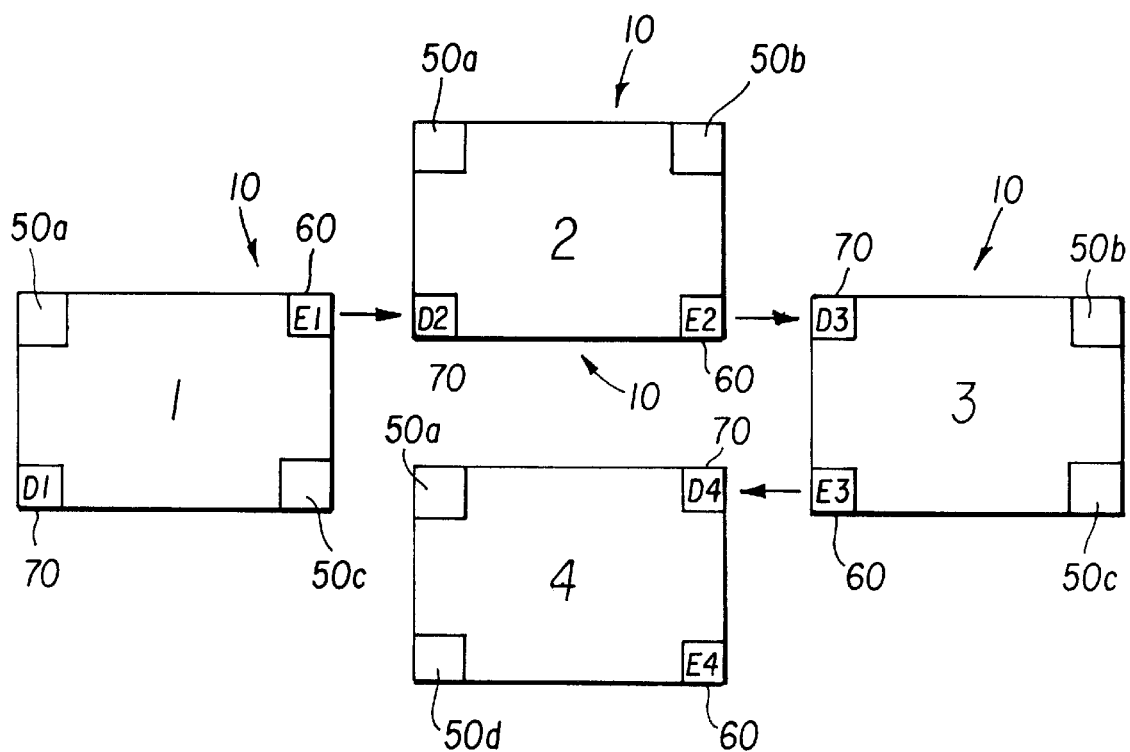
FIG. 4 is a diagram illustrating the flow of sound playback from a plurality of picture frames for, for example, illustrating a narration of an event.

Referring now to FIGS. 3 and 4, a diagram is shown for illustrating the flow of sound playback from a plurality picture frames 10, for example, illustrating a narration of an event. In this regard, the play switch 170 of frame 1 is activated for instructing frame 1 to playback its recorded sound. After completion of its playback, the microprocessor 130 commands the emitter 60 to send its predetermined signal for directing the next frame (i.e., frame 2) in the sequence to emit its recorded sound. The detector 70 of frame 2 will be activated, and all the other detectors 70 will not be activated, because only the detector 70 of frame 2 is preset, via its address index switch 210, to detect the predetermined signal from frame 1. The detector 70 of frame 2 sends a signal to the microcontroller 100 for commanding it to initiate the playback of the recorded sound. After completion of its playback, the emitter 60 of frame 2 sends its predetermined signal to frame 3, and the above-described process is repeated until each frame has completed the playback of its recorded sound. The emitter 60 of the final frame, frame 4 in this example, will obviously be deactivated since it is the last frame.

In an alternative embodiment, one frame 10 could play its recorded sound and then send a signal to two frames, both of which would be preset via the address index switch 210, for permitting both frames 10 to play their recorded sound simultaneously. For example, one frame 10 could play music and the other frame 10 could play spoken text or singing. In this embodiment, only one frame 10 of the two simultaneously playing frames 10 would contain an emitter 60 for initiating the playing of the next frame 10 in the sequence.

To perform a testing procedure, a mode switch 230 is positioned to a test mode. When in the test mode, the play switch 170 is activated for energizing the indicator light 190 without playing the recorded sound and then sends a signal to the emitter for directing it to send its signal to the next frame 10. This permits the entire playing sequence of the frames 10 to be indicated without actually listening to the recorded sound. The switch 230 is returned to its normal position for permitting the above-described normal operation.

The invention has been described with reference to a preferred embodiment. However, it will be appreciated that variations and modifications can be effected by a person of ordinary skill in the art without departing from the scope of the invention.

Parts List:

10 frame
20 image
30*a* hollowed-out portions
30*b* hollowed-out portions
40 sound control module
45 control panel
50*a* hollowed-out portion
50*b* hollowed-out portion
50*c* hollowed-out portion
50*d* hollowed-out portion
60 emitter
70 detector
75*a* housing
75*b* housing
80*a* lens
80*b* lens
80*c* lens
80*d* lens
100 microcontroller
105 wires
110 memory
120 wires
130 signal conditioner
135 wires
140 microphone
145 lead
150 leads
160 recording switch
163 wires
165 bus
170 play switch
175 lead
180 speaker
185 wires
190 indicator light
200 lead
210 index switch
220 address display
225 leads
230 switch
235 lead
240 wire
250 wire

I claim:

1. An image receptacle comprising:
   (a) first means for detecting a first play-mode signal;
   (b) a first sound control module which records sound, and which emits the recorded sound upon receiving the first play-mode signal from said detecting means for emitting the recorded sound associated with the image receptacle; and
   (c) first means, upon receiving a signal from said sound control module, for automatically emitting a second wireless, play-mode signal to a second image receptacle having a second means for detecting the second wireless play-mode signal and having a second sound control module for playing recorded sound for ultimately permitting the second image receptacle to emit its associated sound from the second sound control module.

2. The image receptacle as in claim 1, wherein said first detecting means includes a first detector which is electrically connected to said sound control module, and which detects either infrared, ultrasonic, or audible signals for initiating said sound control module to emit its sound.

3. The image receptacle of claim 2 further comprising a frame having at least two corners for permitting each corner to respectively receive either said first detector or said emitting means.

4. The image receptacle of claim 2, wherein said emitting means includes an infrared emitter.

5. The image receptacle of claim 2, wherein said emitting means is an ultrasonic emitter.

6. The image receptacle of claim 2 further comprising an address display electrically connected to said sound control module for displaying the preselected, first play-mode signal.

7. The image receptacle of claim 2 further comprising a selectable address for selectively defining the first play-mode signal which the first detector receives.

8. The image receptacle as in claim 1, wherein said first detecting means includes a second detector which is electrically connected to said sound control module, and which receives manual manipulation for initiating said sound control module to emit its sound.

9. The image receptacle of claim 8, wherein both said first and second sound control module include a microcontroller for determining the sequence of functions which said sound control module performs.

10. The image receptacle of claim 9, wherein both said first and second sound control module include an erasable memory electrically connected to said microcontroller for storing the recorded sound.

11. The image receptacle of claim 1 further comprising a mode switch electrically connected to said sound control module for switching the picture receptacle between a test mode and a play mode.

12. A method for playing sound sequentially from first and second image receptacles, the method comprising the steps of:
   (a) detecting a first play-mode signal by a first detector of the first image receptacle;
   (b) emitting sound by a first sound control module by the first image receptacle upon receiving the play-mode signal; and
   (c) emitting a second wireless play-mode signal from the first image receptacle to the second image receptacle having a second means for detecting the second wireless play-mode signal and having a second sound control module for playing recorded sound for ultimately permitting the second image receptacle to emit its associated sound from the second sound control module.

13. The method of claim 12 further comprising the step of predetermining the play-mode signal which each image receptacle receives.

14. The method of claim 13 further comprising the step of respectively controlling functions of each image receptacle by a microcontroller contained therein.

15. The method of claim 14 further comprising the step of respectively displaying the first or second play-mode signal of each image receptacle by an address display which is electrically connected to the microcontroller.

16. The method of claim 15 further comprising the step of switching the image receptacle between a test mode and a play mode by a mode switch electrically connected to the microcontroller.

17. The method of claim 16 further comprising the step of storing sound which each image receptacle records in an erasable memory electrically connected to the microcontroller.

\* \* \* \* \*

UNITED STATES PATENT AND TRADEMARK OFFICE
CERTIFICATE OF CORRECTION

PATENT NO. : 5,812,899
DATED : Sept. 22, 1998
INVENTOR(S) : Dale S. Mcintyre

It is certified that error appears in the above-identified patent and that said Letters Patent is hereby corrected as shown below:

On the title page, insert item-- [60]Provisional application No. 60/001,624 filed Jul. 28, 1995--.

Column 1, line 4, insert the following: Reference is made to and priority claimed from U.S. Provisional Application Serial No. 60/001,624, filed 28 Jul. 1995, entitled A METHOD AND APPARATUS FOR PROVIDING AN AUTOMATED NARRATION FOR A PLURALITY OF IMAGES--.

Signed and Sealed this

Eighth Day of June, 1999

Attest:

Q. TODD DICKINSON

*Attesting Officer*     *Acting Commissioner of Patents and Trademarks*